United States Patent [19]

Houn

[11] 4,268,978
[45] May 26, 1981

[54] AUTOMATIC SOUND-EMITTED SELF-LEARNING TOY

[76] Inventor: Lin P. Houn, No. 6, Lane 107, Sec. 1, Tzu Yen Rd., Shih Pai, Peitou, Taipei, Taiwan

[21] Appl. No.: 50,632

[22] Filed: Jun. 21, 1979

[51] Int. Cl.³ .............................................. G09B 3/00
[52] U.S. Cl. ................................................. 434/330
[58] Field of Search ............. 35/9 R, 9 D, 8 A, 35 D

[56] References Cited

U.S. PATENT DOCUMENTS

| | | | |
|---|---|---|---|
| 2,148,259 | 2/1939 | Cisin | 35/9 D |
| 3,015,895 | 1/1962 | Stall | 35/35 D |
| 3,107,436 | 10/1963 | Edwards | 35/9 R |
| 3,380,176 | 4/1968 | Kling et al. | 35/9 R |
| 3,662,477 | 5/1972 | Weinstein | 35/9 R |
| 3,902,256 | 9/1975 | Liu | 35/9 D |
| 4,180,920 | 1/1980 | Ubukata et al. | 35/9 D |
| 4,182,052 | 1/1980 | Liu et al. | 35/9 R |

*Primary Examiner*—William H. Grieb
*Attorney, Agent, or Firm*—Armstrong, Nikaido, Marmelstein & Kubovcik

[57] ABSTRACT

The present invention relates to an automatic sound-emitted self-learning toy characterized by effectively emitting the sound "YES" while the selected answer card coincides with the question card on the base sheet, and "NO" while the two are not in accordance with each other. The answer card, question card and basic sheet are provided with a magnet, when the corresponding magnets are located so as to be attracted to each other, the tape recorder within the rear body connected to the mechanism under the basic sheet will selectively emit the sounds "YES" or "NO" so that children may learn calculation while playing the toy.

1 Claim, 3 Drawing Figures

AUTOMATIC SOUND-EMITTED SELF-LEARNING TOY

FIELD OF INVENTION

The present invention refers to an automatic sound-emitted self-learning toy. More particularly, it refers to a toy of the self-learning type which comprises question and answer card plates with magnets supported on the basic dynamic mechanism box. A plurality of parallel horizontal beams are provided within the basic dynamic mechanism box for connecting to the dynamic mechanism. The basic dynamic mechanism box is in the front part of the toy; the rear part is comprised of: a tape turntable, trumpet, micromotor, battery, gear, and speed change device; the tape recorder will emit the sound "YES" by pressing the sound-emitting pad while the selected question card is in accord with the answer card; otherwise, it will react with "NO".

BACKGROUND OF INVENTION

Conventional toys for counting numbers generally consist of several plates painted with a plurality of figures or numbers. However, they usually require adults to assist the children to judge the right number while the children learn to calculate numbers. The present invention provides children with an automatic sound-emitted self-learning toy to train and develop children in the correct method for calculation without assistance of others. Moreover, it will increase the fun and interest in self-learning education. It will also improve the ability of the child using less effort and a shorter period of time than is required with prior art devices.

SUMMARY OF INVENTION

The primary object of the present invention is to eliminate any need for an adult's assistance while children are playing and practicing calculations.

Another object of the present invention is to provide an automatic sound-emitting means comprising: a tape, trumpet, gears, tape turntable, speed change device, and the dynamic mechanism unit which is driven by means of attracting magnets between card plates and parallel horizontal beams.

Still another object of the present invention is to provide an automatic sound-emitted self-learning toy. The figure of the toy can be different types of animals, robots or human figures.

A further object of the present invention is to provide an automatic sound-emitted self-learning toy. The question card can be painted with figures of different types of animals, plants, fruit, flowers, etc.

The answer card is written with the corresponding numbers thereon so that the player may match the question card to answer card for producing a proper judgement through the sound-emitting pad by emitting a voice of "YES" or "NO".

A still further object of the present invention is to provide an automatic sound-emitted self-learning toy, wherein block magnets are located within the question card and answer card. Cylinder magnets are located in the cylinder holes of the parallel horizontal beams within the basic box. The movement of the beams is controlled by a triangular flange on the sound-emitting pad. Two micro-switches are connected to the beams through a transmission leaf in order to activate the dynamic workings. Accordingly, the gears and speed change device will be influenced by the circuit and then control the tape to emit sound.

DETAILED DESCRIPTION OF INVENTION

Figures 1, 2:
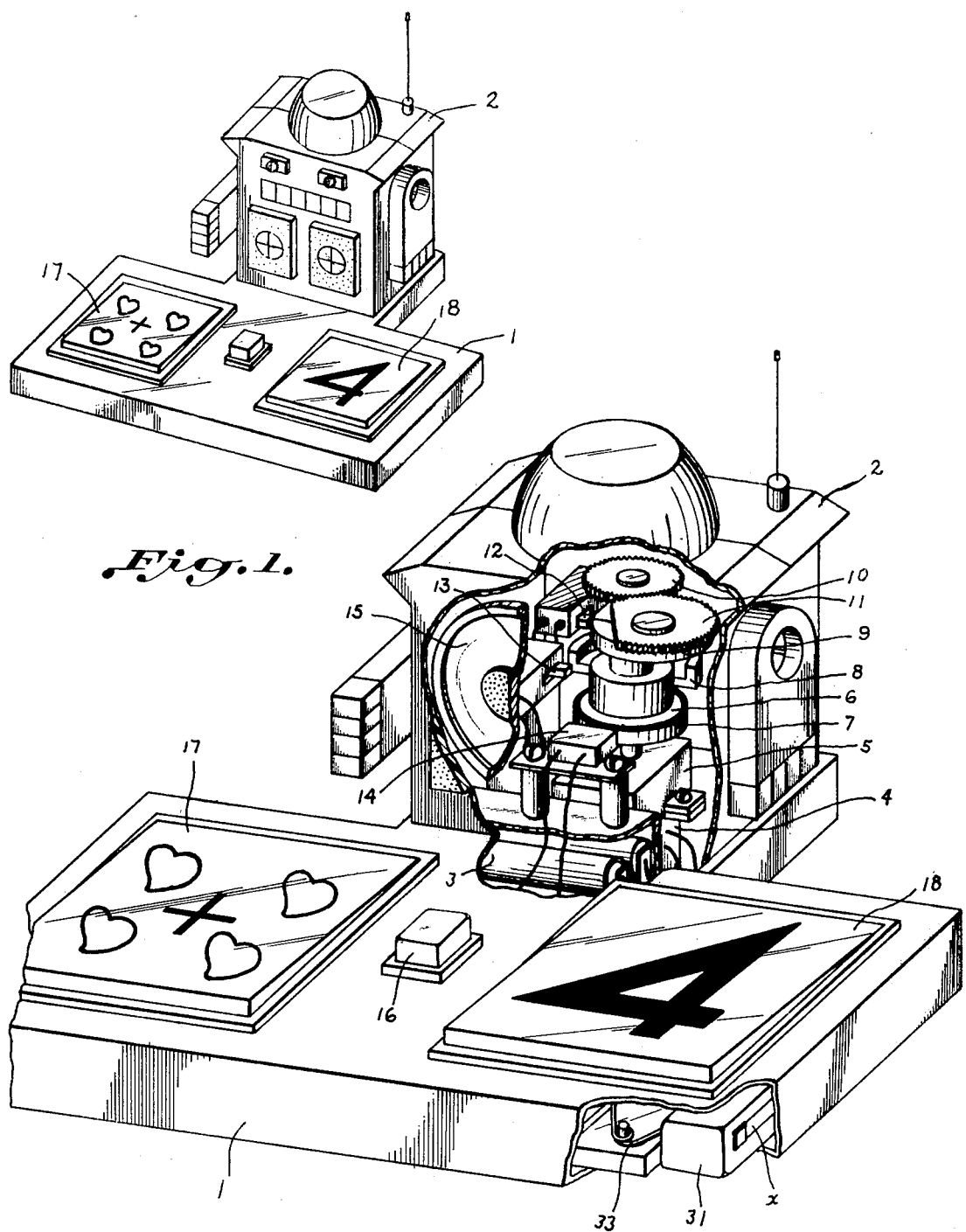
FIG. 1 represents a perspective view according to the present invention.
FIG. 2 represents a partial sectional view according to the present invention.
Figure 3:
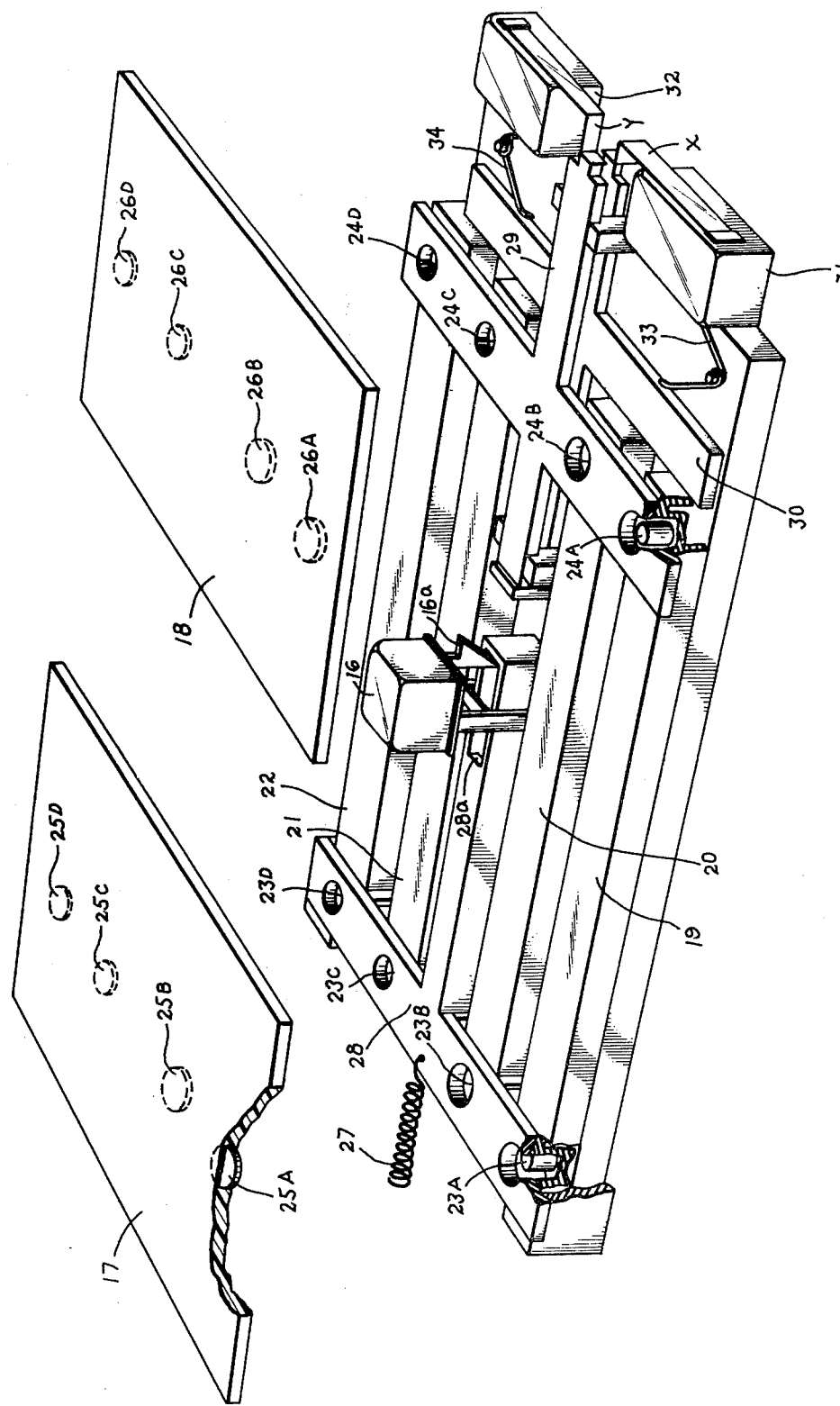
FIG. 3 represents fragmentary perspective view of the dynamic mechanism unit according to the present invention.

Referring to FIGS. 1, 2 and 3, the automatic sound-emitted self-learning toy of the present invention comprises a dynamic mechanism unit box (1), a movable figure of an animal, robot or mankind (2), a battery box for batteries (3), a micro-motor (4), a speed change device (5), a sound-emitting (tape) turntable (6), an annular tape (7), two semi-circular cams (8) and (9), a 30-tooth gear (10), a 60 tooth gear (11), a micro-switch (12), (13), a sound-emitting head (14), a speaker (15), a sound-emitting pad (16), a triangle flange (16a), a question card (17), an answer card (18), several parallel horizontal beams (19), (20),(21),(22), cylinder magnets (23A), (23B), (23C), (23D), (24A), (24B), (24C), (24D), block magnets of question card (25A), (25B), (25C), (25D), block magnets of answer card (26A), (26B), (26C), (26D), a spring (27), movable arms (28), (29), (30), a groove (28a), two microswitches (31), (32), two thrust elements (33), (34) and two transmission leaves (X),(Y). With reference to FIG. (2) and FIG. (3), the first prefered embodiment illustrates the dynamic mechanism unit of the present invention.

A question card 17 is placed on the left side of the corresponding position of the toy and an answer card (18) on the right side. Each card contains only one block magnet. The magnet fixed in the question card (17), for example, is (25A), which attracts the corresponding cylinder magnet (23A) within the horizontal beam (19). The magnet (23A) then mounts upward and sticks between the arm (28) and the horizontal beam (19). The magnet fixed in the answer card (18), for example, is (26A), which attracts the cylinder magnet (24A) within the horizontal beam (19). The cylinder magnet (24A) then mounts upward and sticks between the arm (29) and the said horizontal beam (19). By pressing the pad (16), the triangle flange (16a) thereon is forced downward into the groove (28a). This forces the arm (28) to move to the right-hand side, since the cylinder magnet (23A) stick between the arm (28) and the beam (19). The moving arm (28) drives the beam (19) in the same direction, along with the arm (30). The transmission leaf (X) on the micro-switch (31) is thus contacted with the end of the arm (30). Meanwhile, another transmission leaf (Y) on the micro-switch (32) is also contacted with the end of the arm (29) by means of the right-hand moving beam (19) through the cylinder magnet (24A) stuck therebetween. The work of the micro-switches (31) and (32) are known as the general dynamic mechanism. The micro-switches start the micromotor (14) which is powered by battery (3). The motor rotates the tape (7) on the tape turntable (6) by means of the speed change device (5). Since sound of "YES" or "NO" are recorded on each semi-circle of the tape (7), the "YES" is voiced by pressing the pad (16) while the two micro-switch (31) and (32) are both in action. The semi-circle arms (8), (9) are connected to the tape (7)

and are controlled by the microswitch (12),(13) and the 60 tooth gear (11). The rotation of the speed-change device (5) is stopped automatically after one complete rotation of the tape turntable (6). The tape having the sound "YES" thereon is stopped by the cams (8), (9). While releasing the pad (16), the triangle flange (16) moves upward. The beam (19) is then set back to the original position by the spring (27) and the thrust elements (33),(34). The arms (29),(30) depart the transmission leaves of the microswitch and the motion cycle is completed.

The second situation regarding the placement of the answer cards within the present invention is illustrated hereinafter. A question card (17) is placed on the left side of the corresponding position of the toy, and an answer card (18) on the right side. The magnet fixed in the question card (17), for example, is (25A), it attracts the corresponding cylinder magnet (23A) within the horizontal beam (19). The magnet (23A) then mounts upward and sticks between the arm (28) and the horizontal beam (19). The magnet fixed in the answer card (18), for example, is (26B), it attracts the cylinder magnet (24B) within the beam (20). Then (24B) mounts up and sticks between the arm (29) and the beams (20). By pressing the pad (16), the triangle flange (16a) is forced downward into the groove (28a). This forces arm (28) to move to the righthand side, since the cylinder magnet (23A) sticks between the arm (28) and the beam (19), the moving arm (28) simultaneously drives the beam (19) in the same direction. Furthermore, the arm (30) is driven to the righthand side by the said horizontal beam (19), thus the transmission leaf (X) on the micro-switch (31) is brought into contact with the end of the arm 30. Meanwhile, the cylinder magnet (24B) is attracted upward by the magnet (26B) in the answer card. However, the horizontal beam (20) is not pushed by the arm (28) and is retained in the original position without movement. The arm (29) therefore remains motionless with no connection to the transmission leaf (Y). The work of the micro-switch (31) is the same as the preceding dynamic mechanism illustrated in the first embodiment. Since the microswitch (32) remains motionless the "NO" sound recorded on the semi-circle tape (7) is voiced by pressing the pad (16). The movement mechanism operates in the same manner as previously described.

The corresponding answer cards to the question cards have magnets which are previously arranged thereon in the right positions, such as (26A) to (25A), (26B) to (25B), (26C) to (25C), (26D) to (25D) . . . etc. The parallel horizontal beams (19), (20) . . . are also pre-located in the corresponding positions to the magnets. Accordingly, the magnets are arranged such that when the right answer card is matched with the question card, the "YES" sound will be emitted by pressing the pad through the attractive magnets, and the movement mechanism. Further, more corresponding question cards and answer cards can be designed, and new parallel horizontal beams can also be designed. In addition, the figure body of the toy according to the present invention may be designed with movable arms by supplying rotatable shafts connected with the gears (10), (11) which are in turn connected to a means for creating movement.

The above embodiments are given only for illustration purpose and not by the way of limitation, modification will become evident to those skilled in the art which will fall within the scope of the attached claims.

What is claimed is:

1. An automatic sound-emitting self-learning toy comprising:
   a base;
   a movable figure supported on said base, said figure having two movable arms disposed thereon;
   a plurality of question cards which are insertable within said base, magnets being disposed on said question cards;
   a plurality of answer cards insertable within said base, magnets being disposed on said answer cards;
   a plurality of parallel horizontal beams disposed within said base, said beams having a plurality of holes at both ends wherein a plurality of cylindrically shaped magnets are disposed;
   a movable pad disposed on said base, said pad having a triangular flange connected thereto, said flange being in mechanical connection with a first movable arm which traverses said beams along their first ends;
   a biasing means for forcing said first arm in a first direction;
   a second movable arm positioned perpendicular to said beams and lying across their second ends;
   a third movable arm positioned abutting said second ends of said beams;
   a biasing means forcing said third movable arm in said first direction;
   an electrical switching means in mechanical connection with said second movable arm;
   a means for electronically interpreting a magnetic recording, said means being in electrical contact with said switching means;
   a magnetic recording tape held within said means for electronically interpreting, said tape having an affirmative and a negative response recorded thereon, said toy being comprised such that when a question card and an answer card are inserted in said base, said answer card corresponding to said question card, and said pad is depressed, said switching means activates said means for electronically interpreting and an affirmative response is emitted.

* * * * *